March 8, 1955 — C. E. CHRISTOPHERSEN — 2,703,722
TUBE COUPLING WITH FRUSTO-CONICAL METALLIC SEAL
Filed June 19, 1951
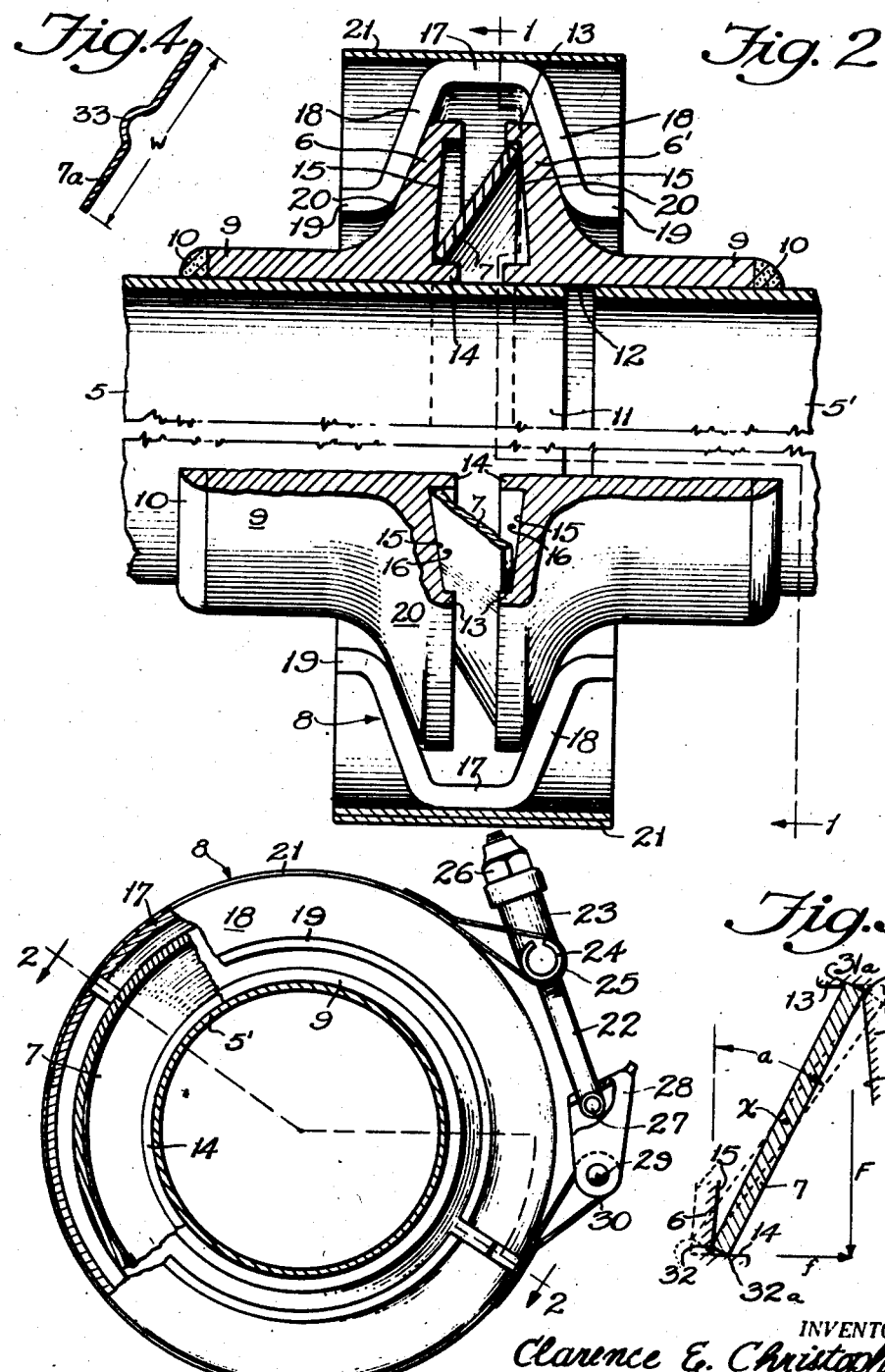
INVENTOR.
Clarence E. Christophersen
BY Lynn V. Latta
—ATTORNEY—

United States Patent Office 2,703,722
Patented Mar. 8, 1955

2,703,722

TUBE COUPLING WITH FRUSTO-CONICAL METALLIC SEAL

Clarence E. Christophersen, Inglewood, Calif., assignor to Marman Products Company, Inc., Inglewood, Calif., a corporation of California Application June 19, 1951, Serial No. 232,429

1 Claim. (Cl. 285—129)

This invention relates to tube couplings. It is directed particularly to tube couplings for use under conditions where conventional packing means (e. g. gaskets of rubber, cork, or composition material subject to deterioration at high temperatures) cannot be satisfactorily employed. Examples of such use are couplings for high temperature steam lines or exhaust pipes of diesel and other internal combustion engines. The primary object of the invention is to provide a coupling having efficient fluid sealing means not subject to deterioration under such conditions. More specifically, the invention has as an object to provide a tube coupling having an all metal seal.

A further object of the invention is to provide a coupling having a metallic seal of relatively simple and inexpensive construction yet thoroughly dependable and extremely durable in operation. Another object is to provide a coupling having a metallic seal, the entire coupling being assembled with great ease.

Toward the attainment of the foregoing objects, the invention contemplates a fluid coupling embodying the combination of a pair of radial flanges having opposed face grooves therein, defined between radially spaced inner and outer annular lips on said flanges; together with a resilient, annular sealing ring of Belleville washer type, interposed between said flanges, seated in said face grooves, and adapted to be subjected to axial pressure such as to expand the periphery thereof and contract the inner margin thereof into sealing engagement with said outer and inner lips respectively, to establish a fluid tight seal; together with an actuator ring for exerting a wedging action against said flanges to press them toward each other, said ring embodying a sectional V-band and a constrictor band for applying radial compression to the sections thereof.

Other objects will become apparent in the ensuing specifications and appended drawings in which:

Fig. 1 is a cross sectional view through one of a pair of tube sections having my improved coupling mechanism installed thereon and connecting the same, a portion of the coupling likewise being shown in cross section, the section being taken approximately as indicated by the line 1—1 of Fig. 2;

Fig. 2 is a view partially in side elevation and partially in axial section, of the tube sections and coupling, taken generally as indicated by the line 2—2 of Fig. 1;

Fig. 3 is an enlarged detail of the sealing ring and portions of the associated flanges, illustrating in dotted lines and full lines respectively, in somewhat exaggerated degree, the deformation of the sealing ring between an initial position of assembly prior to the application of compression thereto, and a final position in which it has established a tight seal under axial compression; and Fig. 4 is a detail cross sectional view of a sealing ring embodying a modified form of the invention.

As an example of one form in which the invention may be embodied, I have shown in Figs. 1, 2 and 3 a coupling for joining a pair of tube sections 5 and 5' respectively, said coupling embodying generally a pair of flanges 6 and 6', a resilient frusto-conical sealing ring 7 in the nature of a Belleville washer, and a V-band actuator ring assembly which is indicated generally at 8.

Each of the flanges 6 is formed integrally with a cylindrical collar 9 which is snugly fitted upon the end portion of a respective tube section 5 or 5', and is secured thereto, with a fluid tight connection, by any suitable means such as a fillet of weld metal 10 welded respectively to the end of the collar and to the outer wall of the respective tube section. Tube section 5 has an end portion 11 projecting axially beyond flange 6 and constituting a pilot which is receivable within a socket 12 defined by the inner wall of flange 6', projecting beyond the end of tube section 5'.

Flange 6' has a peripheral, axially projecting lip 13. Flange 6 has an axially extending lip 14 at its inner diameter. In order that the two flanges may be constructed from an identical pattern, flange 6 may also have a peripheral lip 13, and flange 6' may have an inner lip 14. The duplication of lips is a preferred construction for another reason: it makes it possible to assemble the coupling with the ring 7 facing in either direction along the axis of the coupling, i. e., without the necessity for taking the trouble to determine whether the ring should face one way or the other. However, the alternate lips are not essential to the sealing function to be hereinafter described. Lips 13, 14 are joined by a slightly coned, substantially radial wall 15 in each of the flanges 6, 6', the walls 15 cooperating with lips 13 and 14 to define annular face grooves 16 in the opposed faces of the flanges 6, 6'. The respective margins of sealing ring 7 are received in the grooves 16.

Actuator ring assembly 8 comprises a pair of semi-circular wedging jaws of V-channel section, each having a web portion 17, a pair of inwardly diverging side members 18 and axially extending reinforcing flanges 19 at the inner extremities thereof. The inner walls of side members 18 are frusto-conical and are fitted to a pair of correspondingly frusto-conical outer walls 20 formed on the flanges 6, 6', whereby, upon moving radially inwardly, the jaws 17, 18 will exert a wedging action against the flanges 6, 6', forcing them axially toward each other.

For actuating the jaws 17, 18, I utilize a constrictor band 21 of relatively thin, high strength ribbon metal, the ends of which are joined by a conventional take-up mechanism, which, in the detailed features thereof, forms no part of the present invention. Such take-up mechanism may, for example, comprise a T-bolt 22 having a threaded end extending through the collar 23 of a T-trunnion having trunnion elements 24 lodged in the respective portions of a bifurcated loop 25 on one end of constrictor band 21, a nut 26 threaded onto the threaded end of bolt 22 and engaging collar 23, and a T-head 27 on the other end of bolt 22, hooked into a receptacle 28 attached by a pivot 29 to a loop 30 on the other end of constrictor band 21.

Operation

In the manipulation of the coupling to couple together the tube sections 5, 5', pilot 11 is slipped into socket 12 after sealing ring 7 has been slipped over the end of the pilot and over lip 14 into the face groove 16 of flange 6. With the sealing ring thus piloted on lip 14, flange 6' is moved into engagement with the sealing ring so that the periphery of the latter is received in face groove 16 of flange 6'. Actuator ring assembly 8 is then fitted over flanges 6, 6', the flexibility of constrictor band 21 allowing the jaw sections 17, 18 to be spread apart sufficiently to receive the flanges 6, 6'. The take-up mechanism is then coupled by insertion of head 27 into receptacle 28. By advancing the nut 26 on bolt 22, tension will be developed in constrictor band 21 to draw the jaws 17, 18 radially inwardly, the side portions 18 thereof exerting a camming or wedging action against the frusto-conical walls 20 of flanges 6, 6' to force the latter toward each other.

Referring now to Fig. 3, the position of the sealing ring 7 relative to flanges 6, 6' prior to subjecting the sealing ring to deflection is indicated in dotted lines in that figure. The axially remote edges 31, 32 respectively of the outer and inner margins of ring 7 are engaged lightly against the radial walls 15 of flanges 6', 6 respectively. The radially remote edges 31a, 32a of said outer and inner margins are out of contact with the cylindrical inner walls of lips 13 and 14 respectively (except at the point where ring 7 may rest by gravity on lip 14). As ring 7 is subjected to the opposing axial pressures imparted thereto by flanges 6, 6', the peripheral portion thereof will be placed under tension and stretched to an increased diameter, while the inner portion thereof will be be compressed to a reduced diameter. Consequently, the clearance between radially remote edges 31a, 32a and the respective inner walls of lips 13 and 14 respectively will be taken up; and the edges 31a, 32a will engage these cylindrical walls, and, with increasing pressure, will establish circular lines of sealing engaging therewith. Full pressure sealing engagement is established without bringing the ends of lips 13, 14 together. Where the ring in its unstressed state has its edges fitted fairly closely to the inner walls of lips 13, 14, a minimum amount of deflection of the ring 7 will be required in order to properly seal the edges 31a, 32a against the lips 13, 14. Accordingly, the initial spacing between flanges 6, 6' may be correspondingly at a minimum without encountering the difficulty of having the lips come together before a satisfactory seal is established.

The efficiency of the seal that is established, depends primarily upon the engagement of edges 31a, 32a with the cylindrical shoulders defined within lips 13, 14. The axial pressure which is applied to the edges 31, 32 by walls 15 is converted into radial pressure of a higher intensity owing to the fact that the angle of inclination of the wall of ring 7 with relation to a plane normal to its axis (designated $a$) is considerably less than 45°. Approximately a 30° angle is indicated in the drawings. However, the angle may range much lower (e. g., approaching 5°), depending partially upon the amount of tolerance between the edges of the sealing ring and the lips 13, 14 respectively.

The conversion of axial pressure into radial pressure of a higher intensity utilizes the principle of toggle action, each increment of radial section of the ring 7 functioning as a toggle lever, and the ratio of force multiplication increasing as the ring 7 is flattened.

The maximum angle of inclination is determined by the degree of force multiplication required in order to establish adequate pressure contact between edges 31a, 32a and lips 13, 14. In order to attain sufficient force multiplication, the angle of inclination is preferably not over 30°. At this angle, a force multiplication of roughly two to one is obtained, as indicated graphically in Fig. 3 by the vector arrows $f$ and $F$ respectively, the former indicating the axial load applied by jaws 17, 18 and the latter indicating the resolved force in a radial direction, effective to press the edges 31a, 32a against lips 13, 14. The optimum condition is one in which the angle $a$ lies somewhere within the range of maximum and minimum angles indicated above. A quite satisfactory construction is one in which the angle of inclination of ring 7 in its unstressed state, is within the range between 10° and 15°.

The maximum and minimum diameters of the ring 7 are preferably so related to the diameters of the inner cylindrical walls of lips 13 and 14 respectively, as to have just sufficient clearance to make it possible to readily slip the ring 7 into the face grooves 16 without binding against said inner walls. In preferred practice, the grooves 16 will be machined on a lathe, to obtain accurate concentricity of the inner walls of lips 13, 14. The Belleville washer rings 7, stamped from accurately turned dies, may also have fairly accurate concentricity and circular shape. Thus it is possible to avoid any appreciable distortion of the annular outline of the ring 7 in order to establish full pressure contact throughout its circumference with the lips 13, 14. The optimum desideratum is a condition in which the distortion of the ring 7 is limited to a uniform flattening about its neutral axis indicated at $x$ in Fig. 3 in order to change the angle $a$. However, it will be understood that a slight degree of distortion of the contours of the marginal edges of the ring 7 in order to compensate for any slight divergence between said contours and the contours of the cylindrical inner walls of lips 13, 14, will be accommodated by the resiliency of the ring. Suppose, for example, that the ring as viewed along its axis is very slightly oval shaped instead of truly circular, so that its edges 31a, 32a will initially establish contact only at two diametrically opposed points, with the truly cylindrical walls of lips 13, 14. As axial pressure is gradually applied, deflecting the ring to a flatter shape, stretching its outer margin and shrinking its inner margin, the high radial component of force $F$ will expand the periphery of ring 7 along its minimum diameter, so as to bring all portions of its peripheral edge 31a into full pressure contact with lip 13, and will correspondingly shrink the inner margin of the ring along its major diameter until the inner edge 32a is drawn into full pressure constricting engagement with the inner lip 14 throughout the circumference thereof. This ability to distort from a slightly oval form to a full circular form or vice versa is increased as the angle of inclination $a$ is decreased. That is to say, the radial force $F$ available for stretching the periphery and shrinking the inner margin of the ring 7 is increased with a decrease in angle $a$. At the same time the range of dimensional change in a radial direction, within the range of deflection of the ring, is decreased with a decrease in angle $a$. Obviously, the optimum angle is therefore determined by a selected mean between maximum range of radial dimensional change and maximum resolution of force to obtain maximum radial pressure of the edges of the ring against the lips 13, 14.

Fig. 4 illustrates a cross section of a modified sealing ring 7a of "marcel" design having a concentric corrugation 33 which provides radial yieldability in the ring. With its respective margins engaged against lips 13, 14, it will, in response to flattening deflection thereof, be compressed radially to a reduced radial cross-sectional width. This feature amplifies its capacity to modify its marginal contours to conform to the contours of lips 13, 14. The cross sectional width referred to is the dimension W.

I claim:

In a fluid sealing tube coupling: a pair of axially spaced tube-end flanges having respective inner and outer, radially spaced integral lips extending axially into the space between them, said flanges each having a radial face bridging between its respective lips and said lips defining generally axially extending shoulders at the respective inner and outer extremities of said radial faces and integral therewith; axial pressure-applying means comprising a pair of semi-annular jaws of V-channel section having inner walls in embracing engagement with said tube-end flanges for urging them toward one another, a flexible constrictor band encircling said jaws, and means connecting the ends of said band and operative to constrict the band so as to apply constricting pressure to said jaws, thereby to move them radially inwardly so as to exert a wedging action against said flanges, drawing them together; and a seal consisting in a frustro-conical, Belleville washer type ring of resilient elastic material having substantially parallel frustro-conical side faces and having inner and outer margins each consisting in a single frustro-conical marginal face which, in radial cross section, is substantially at right angles to the respective side faces, whereby said side faces and the marginal faces cooperatively define a pair of axially remote edges and a pair of radially remote edges; said ring being interposed between said flanges with said axially remote edges bearing against said side faces so as to receive axial compressive forces therefrom, for stressing said ring to expand and contract its said outer and inner margins respectively; and said radially remote edges, when said margins are thus respectively expanded and contracted, bearing against the respective shoulders with circular lines of contact establishing a tight seal between said flanges through said ring; said ring, with reference to the planes of said side faces, defining a coning angle of not over substantially 30°, whereby the axial loads applied to the ring will be resolved into radial loads of higher intensity for developing a high pressure engagement between said shoulders and said radially remote ring edges, with the latter becoming embedded in said shoulders at said circular lines of contact, in axially fixed relation to said shoulders.

References Cited in the file of this patent

UNITED STATES PATENTS

| | | |
|---|---|---|
| 931,914 | Connor | Aug. 24, 1909 |
| 1,556,745 | Banta | Oct. 13, 1925 |
| 1,721,326 | Wilson | July 16, 1929 |
| 1,866,160 | Griswold | July 5, 1932 |
| 1,965,273 | Wilson | July 3, 1934 |
| 2,426,423 | Woolsey | Aug. 26, 1947 |
| 2,456,203 | Loepsinger | Dec. 14, 1948 |
| 2,541,205 | Christophersen | Feb. 13, 1951 |

FOREIGN PATENTS

| | | |
|---|---|---|
| 518,460 | Great Britain | Feb. 17, 1940 |